United States Patent [19]

Warihashi

[11] 4,331,295
[45] May 25, 1982

[54] WINDSHIELD WASHER

[76] Inventor: Hisanori Warihashi, 43-4, Daita 1-chome, Setagaya-ku, Tokyo, Japan

[21] Appl. No.: 143,288

[22] Filed: Apr. 24, 1980

[30] Foreign Application Priority Data

Apr. 27, 1979 [JP] Japan .............................. 54/55850[U]

[51] Int. Cl.³ .............................................. B05B 1/10
[52] U.S. Cl. .................................. 239/284 R; 239/305; 239/334; 415/92; 415/152 R; 417/442
[58] Field of Search .............. 239/284 R, 284 A, 305, 239/334; 417/442; 415/92, 152 R, 153 R

[56] References Cited

U.S. PATENT DOCUMENTS

| | | | |
|---|---|---|---|
| 396,759 | 1/1889 | Mindt | 415/152 |
| 873,075 | 12/1907 | Oliver | 415/92 |
| 1,158,569 | 11/1915 | Sebald | 415/153 |
| 1,782,277 | 11/1930 | Smith | 415/152 |
| 1,883,634 | 10/1932 | Easton | 415/152 |
| 2,914,256 | 11/1959 | O'Shei | 239/284 |
| 3,286,932 | 11/1966 | Kibler | 239/284 |
| 3,486,695 | 12/1969 | Novak | 239/305 |

Primary Examiner—Robert B. Reeves
Assistant Examiner—Michael J. Forman
Attorney, Agent, or Firm—Stephen F. K. Yee

[57] ABSTRACT

A windshield washer having a jet nozzle adapted for ejecting a washing liquid to a windshield, a first reservoir for containing a first liquid such as water, a second reservoir for containing a second liquid such as a detergent solution, and a pump having a rotor for feeding the first or second liquid to the jet nozzle. By rotating the rotor selectively in the forward or reverse direction, the desired first or the second liquid is ejected from the jet nozzle as the washing liquid.

8 Claims, 5 Drawing Figures

F I G. 3
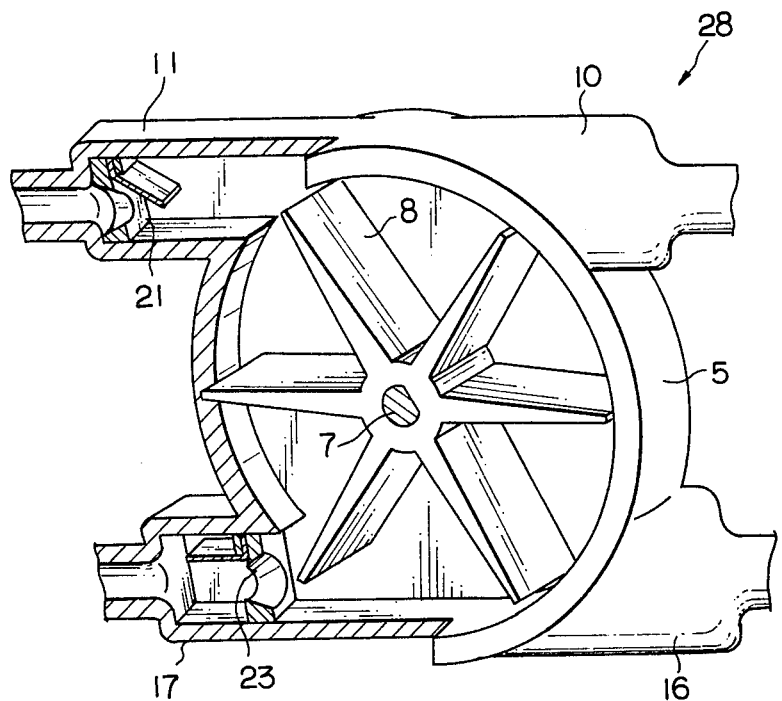
F I G. 4
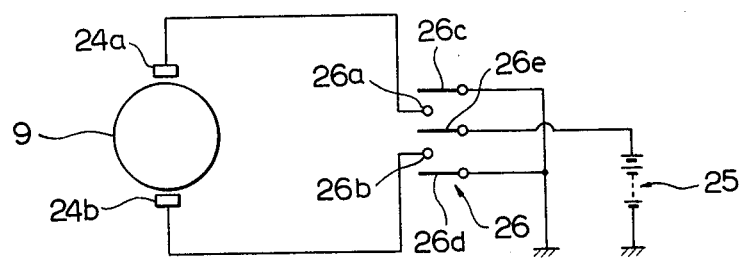

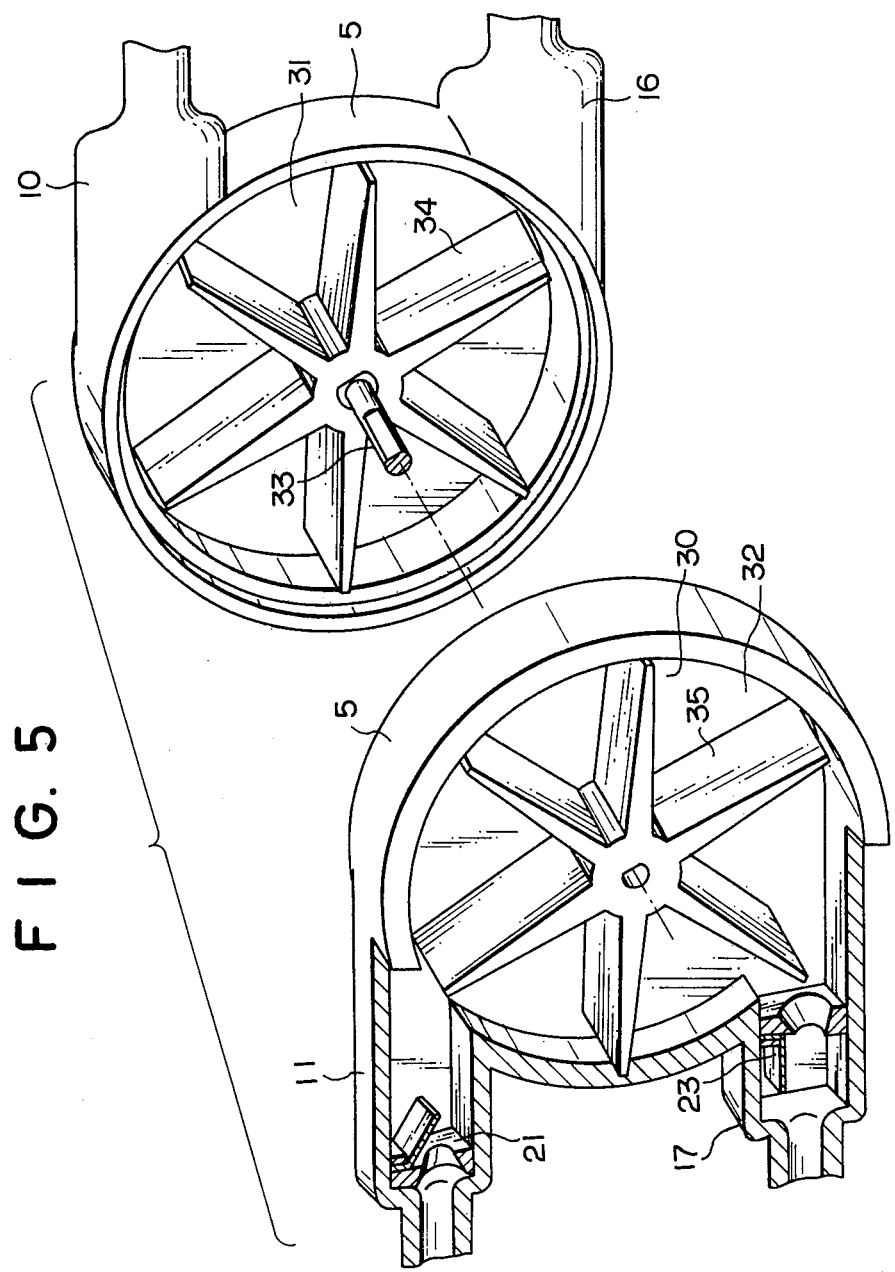

WINDSHIELD WASHER

BACKGROUND OF THE INVENTION

This invention relates to a windshield washer for cleaning a windshield of automobiles or other vehicles of soils such as oil films, muddy water and the like.

In conventional windshield washers, a cleaning liquid which contains a detergent in a predetermined concentration is sent from a tank to a jet nozzle and thereby spouted onto a windshield for cleaning it with an oscillating wiper. The soils on the windshield generally include muddy water or oil films, of which the former is easily washed away with water alone but the removal of the latter needs a liquid containing a detergent. Therefore, it is uneconomical to use a cleaning solution only for the purpose of removing smudges of muddy water. If the concentration of the detergent is lowered to reduce its consumption, then it takes a longer time for removing oil films on the windshield, which is undesirable from the standpoint of safe driving.

SUMMARY OF THE INVENTION

It is, therefore, an object of the present invention to provide a windshield washer which overcomes the above-mentioned drawback of the conventional devices.

Another object of the present invention is to provide a windshield washer which allows selective use of two kinds of washing liquids, for example, water and a solution of a detergent.

It is a special object of the present invention to provide a pump for a windshield washer of the sort just mentioned.

BRIEF DESCRIPTION OF THE DRAWINGS

Other objects, features and advantages of the present invention will become apparent from the detailed description of the preferred embodiments which follows, when considered in light of the accompanying drawings, in which:

FIG. 3 is an enlarged fragmentary perspective view, partly cut away, showing the washer pump of the windshield washer of FIG. 1;

FIG. 4 is a circuit diagram of the washer pump; and

FIG. 5 is a fragmentary exploded view, partly cut away, showing another example of the washer pump according to the present invention.

DESCRIPTION OF THE PREFERRED EMBODIMENTS

Figure 1:
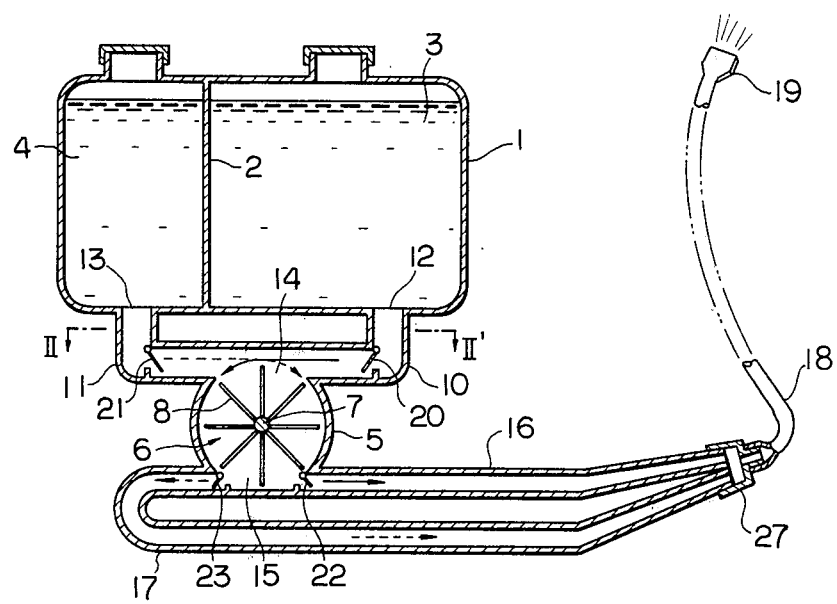
FIG. 1 is a sectional view, partly in elevation, diagrammatically showing a windshield washer according to the present invention.
Figure 2:
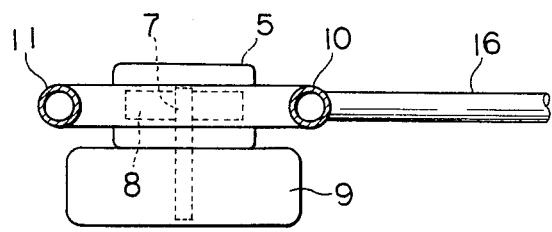
FIG. 2 is a fragmentary cross-sectional view taken on line II—II' of FIG. 1.

Referring to FIGS. 1, 2 and 3, the windshield washer of this invention includes a tank 1 the inside of which is divided into two reservoirs 3 and 4 by a partition wall 2. The reservoir 3 holds a first liquid, for example, water while the other reservoir 4 holds a second liquid, for example, an aqueous solution of a suitable detergent.

Designated generally by the reference numeral 28 is a washer pump which includes a cylindrical pump housing 5 located at a level lower than the tank 1. A rotor member 6 is arranged within the housing 5 and has an axially mounted spindle 7 which supports thereon a number of radial blades or vanes 8. The spindle 7 extends through one end of the housing 5 and is operatively connected to an output shaft of a drive motor 9. As will be described hereinafter, the motor 9 is rotatable in both forward and reverse directions to rotatingly drive the rotor member 6 in a desired direction. Upon rotating the rotor 6, a votex is established within the housing member 5, causing the liquid to whirl in a vortex pattern along the inner periphery of the housing in the direction of rotation of the rotor 6.

A first liquid feed conduit 10 and a second liquid feed conduit 11 extend between the reservoir 3 and the housing 5 and between the reservoir 4 and the housing 5, respectively. More particularly, one end of each of the conduits 10 and 11 is connected to outlets 12 and 13 at the bottom of the reservoirs 3 and 4, respectively. The other ends of the conduits 10 and 11 are connected jointly to an inlet 14 of the housing member 5.

The conduit 10 opens into the housing member 5 such that the liquid within the conduit 10 is suctioned when the rotor member 6 is rotated in one particular direction (counterclockwise, in the particular case illustrated in FIG. 1), the liquid being pressurized when the rotor 6 is rotated in the other direction (clockwise). On the other hand, the conduit 11 is opens into the housing member 5 such that the liquid in the conduit 11 is suctioned by the clockwise rotation of the rotor 6 and pressurized by the counterclockwise rotation. Thus, it is preferred that the conduits 10 and 11 open into the housing member 5 in opposite tangential directions. However, the orientation conduits 10 and 11 may deviate from the tangential directions, provided that when the liquid within one conduit is pressurized, the liquid within the other is suctioned.

Although the conduits 10 and 11 are illustrated as being connected to the common inlet 14 of the housing member 5 in the particular embodiment shown, they may be connected to separate inlets if desired. However, the connection to a common inlet is preferred in view of the easier fabrication and simpler construction.

The housing member 5 is provided with an outlet 15, preferably opposite to the inlet 14, from which a first liquid discharge conduit 16 and a second liquid-discharge conduit 17 branch. The discharge conduits 16 and 17 are connected with the outlet 15 in the same manner as the afore-mentioned feed conduits 10 and 11. More particularly, the conduit 16 opens into the housing member 5 such that the liquid within the conduit 16 is pressurized by rotation of the rotor 6 in the one particular direction (counterclockwise) and suctioned by rotation in the other direction (clockwise). On the contrary, the discharge conduit 17 opens into the housing member 5 such that the liquid within the conduit 17 is pressurized by the clockwise rotation of the rotor 6 and suctioned by the counterclockwise rotation. Similar to the feed conduits 10 and 11, the discharge conduits 16 and 17 are preferred to open into the housing member 5 substantially in opposite tangential directions. If desired, the discharge conduits 16 and 17 may be connected to separate outlets of the housing member 5.

The other ends of the discharge conduits 16 and 17 are preferably joined together and connected to one end of a tube 18 by suitable connecting means 27. The other end of the tube 18 is connected to a jet nozzle 19 which is directed toward a windshield, not shown, and located at a position higher than the tank 1. Of course, it is possible to provide two separate jet nozzles in communication with the discharge conduits 16 and 17, if desired.

The feed conduits 10 and 11 and, preferably the discharge conduits 16 and 17 as well, are provided with first to fourth check valves 20 to 23, respectively. The first check valve 20 is provided to prevent liquid flow therethrough from the housing member 5 toward the first liquid reservoir 3, and the second check valve 21 for preventing liquid flow therethrough from the housing 5 toward the second liquid reservoir 4. The third and fourth check valves 22 and 23 are provided for preventing liquid flows therethrough in the discharge conduits 16 and 17 toward the housing member 5. The check valves 20 to 23, may be swing check valves, ball check valves or any other suitable check valves of known construction.

The motor 9 is selectively rotated in a forward or reverse direction by a drive circuit as shown in FIG. 4, in which indicated at 24a and 24b are brushes of the motor 9, at 25 a DC power source, and at 26 a switch having contact points 26a and 26b and contact segments 26c, 26d and 26e.

The washer of the above-described construction operates as follows. If the switch 26 which is in a neutral position in FIG. 4 is turned to a first position to connect the contact point 26a with the segment 26e and the contact point 26b with the segment 26d, the motor 9 is rotated in one direction, rotating counterclockwise the rotor member 6 which is connected to the output shaft of the motor 9. As a result, the valves 20 and 22 are subjected to negative and positive pressures, respectively, and held in open positions, allowing only the first liquid (e.g., water) in the first reservoir 3 to be fed continuously through the liquid feed and discharge conduits 10 and 16 (as shown in the solid arrow in FIG. 1) and ejected to the windshield by the jet nozzle 19. At this time, the valves 21 and 23 are subjected to positive and negative pressures, respectively and held in closed positions so that the second liquid (e.g., a detergent solution) is prevented from being discharged from the reservoir 4 and the first liquid is prevented from streaming into the discharge conduit 17.

If the switch 26 is turned to a second position to connect the contact point 26a with the segment 26c and the contact point 26b with the segment 26e, the motor 9 is rotated in the reverse direction, rotating the rotor 6 clockwise. This rotation gives a positive pressure to the liquids in the first liquid feed conduit 10 and second liquid discharge conduit 17 while giving a negative pressure to the liquids in the first liquid discharge conduit 16 and second liquid feed conduit 11. As a result, the valves 20 and 22 are closed and valves 21 and 23 are opened. Thus, the second liquid alone is fed successively through the feed and discharge conduits 11 and 17, as indicated by the broken arrow, and ejected toward the windshield by the jet nozzle 19.

In the above embodiment, the third and fourth check valves 22 and 23 are not absolutely necessary for operation of the washer, but serve to prevent the liquid in the discharge conduit 16 or 17 from flowing into the conduit 17 or 16.

In the above embodiment, the washing liquid initially discharged from the jet nozzle 19 is the liquid which is present within the pipe 18, conduit 16 or 17, and the housing 5. Thus, for example, even when the first liquid, for example, is intended to be ejected from the nozzle 19, it is possible that the second liquid remaining in the pump housing 5 and pipe 18 is initially ejected, the amount of which depends on the volume of the housing 5 and the pipe 18. FIG. 5 depicts another example of the washer pump for the windshield washer of this invention, in which like parts are designated by like reference numerals. In this variant, the inside space of the cylindrical housing member 5 is divided by a radially extending partition plate 30 into axially spaced first and second pump chambers 31 and 32, and the rotor member 6 includes first and second impeller members 34 and 35 arranged within the first and second pump chambers 31 and 32, respectively. The first and second impeller members 31 and 32 are rigidly mounted on a common spindle 33 which extends through the partition plate 30 and the opposite end (not shown) of the housing member 5 and is connected here to a drive shaft of the motor 9 (not shown).

Upon rotation of the rotor member 6 in one direction, for example, clockwise, the check valves 21 and 23 are opened while the check valves 20 and 22 (FIG. 1) are closed in the same principle as described previously so that the second liquid alone is fed successively through the second liquid feed conduit 11, the second check valve 21, the second pump chamber 32 and the second liquid discharge conduit 17, to the jet nozzle 19 (FIG. 1) for ejection therefrom. In this case, as a result of the independent design of the pump chambers 31 and 32, the first liquid present in the first pump chamber 31 is not discharged therefrom. Further, because of such an independent design, the impeller members 34 and 35 can be bent or shaped into a bucket form so as to facilitate the formation of vortex within each pump chamber.

In the foregoing embodiments, the reservoirs 3 and 4 for the first and second liquids may be formed independently of each other and located in separate positions, if desired. The reservoirs may be in the form of either a rigid metal container or a flexible bag.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A windshield washer comprising:
   a jet nozzle member adapted for ejecting a washing liquid to the surface of a windshield;
   a first reservoir for containing a first liquid;
   a second reservoir for containing a second liquid;
   a pump unit having a cylindrical housing member, a rotor member reversibly rotatably arranged within said housing member and so constructed that the rotation thereof causes the liquid within said housing member to whirl in a vortex pattern along the inner periphery of said housing member in the same direction as the rotation of said rotor member, and a drive means for rotating said rotor member selectively in a forward or reverse direction;
   a first liquid feed conduit extending between the first reservoir and said housing member and opening into said housing member in a direction in which the liquid within said first liquid feed conduit is suctioned by rotation in one direction of said rotor member and pressurized by rotation in the other direction;

a second liquid feed conduit extending between the second reservoir and said housing member and opening into said housing member in a direction in which the liquid within said second liquid feed conduit is suctioned by rotation of said rotor member in said the other direction and pressurized by rotation in said one direction;

a first liquid discharge conduit having one end opening into said housing member in a direction in which the liquid within said first liquid discharge conduit is pressurized by rotation of said rotor member in said one direction and suctioned by rotation in said the other direction;

a second liquid discharge conduit having one end opening into said housing member in a direction in which the liquid within said second liquid discharge conduit is pressurized by rotation of said rotor member in said the other direction and suctioned by rotation in said one direction;

the other ends of said first and second liquid discharge conduits being in fluid communication with said jet nozzle member; and first and second check valve means provided respectively in said first and second liquid feed conduits for preventing liquid flows therethrough toward said first and second reservoirs, respectively, whereby said first or second liquid is selectively fed by rotation of said rotor member in said one or other direction to said jet nozzle for ejection as said washing liquid.

2. A windshield washer as claimed in claim 1, wherein said first and second liquid feed conduits and said first and second liquid discharge conduits open into said housing substantially in a direction tangential to the inner periphery of said housing member.

3. A windshield washer as claimed in claim 2, wherein said first and second liquid feed conduits are connected to a first common opening of said housing member and said first and second liquid discharge conduits are connected to a second common opening of said housing member opposite to said first common opening.

4. A windshield washer as claimed in claim 1, wherein the inside space of said housing member is divided by a partition plate into axially spaced first and second chambers, said first liquid feed and first liquid discharge conduits opening into said first chamber and said second liquid feed and second liquid discharge conduits opening into said second chamber, said rotor member including operatively connected, axially spaced first and second impeller members located within said first and second chambers, respectively.

5. A windshield washer as claimed in claim 1 or 4, further comprising third and fourth check valve means provided respectively in said first and second liquid discharge conduits for preventing liquid flows therethrough toward said housing member.

6. A windshield washer as claimed in claim 1, wherein said first and second reservoirs are integrated into a unitary structure.

7. A windshield washer as claimed in claim 1, wherein said drive means includes a motor for rotatingly driving said rotor member in either direction and a switch means coupled to said motor for selecting the direction of revolution of said motor.

8. A windshield washer as claimed in claim 1, wherein said first and second liquids are water and a detergent solution, respectively.

* * * * *